United States Patent [19]

Richards

[11] Patent Number: 4,538,869
[45] Date of Patent: Sep. 3, 1985

[54] ELECTRICAL CONNECTOR HOUSING

[75] Inventor: Craig D. Richards, Boiling Springs, Pa.

[73] Assignee: AMP, Harrisburg, Pa.

[21] Appl. No.: 593,223

[22] Filed: Mar. 27, 1984

[51] Int. Cl.³ .......................................... H01R 13/422
[52] U.S. Cl. .............................. 339/59 M; 339/210 M
[58] Field of Search ............... 339/59 R, 59 M, 75 P, 339/107, 143 R, 206 R, 210 R, 210 M, 242; 174/59, 60, 35 C, 50.52, 50.53, 92

[56] References Cited

U.S. PATENT DOCUMENTS

| | | | |
|---|---|---|---|
| 1,871,938 | 8/1932 | Woodworth | 174/59 |
| 2,710,949 | 6/1955 | Happe et al. | 339/210 R |
| 3,920,306 | 11/1975 | Barnett, Jr. et al. | 339/107 |
| 3,994,555 | 11/1976 | Konno et al. | 339/59 R |
| 4,234,760 | 11/1980 | Lawson | 174/92 |
| 4,243,287 | 1/1981 | Smith et al. | 339/59 R |

FOREIGN PATENT DOCUMENTS 44425 12/1908 Switzerland .................. 174/59

*Primary Examiner*—John McQuade
*Attorney, Agent, or Firm*—Gerald K. Kita

[57] ABSTRACT

An electrical connector housing comprises substantially identically-shaped housing members of dielectric material hingedly connected together along straight sides. Each housing member includes a hollow body section having a generally triangular configuration. Spaced projections are located in the body sections and include arcuate recesses to accommodate a T-shaped coaxial connector and maintain the connector in position when the body sections are in a closed position to encompass the connector. Semicircular sections extend outwardly from respective sides of the body sections and form tubular members to cover parts of the connector, the semicircular sections including part-conical sections that can be trimmed to form an opening having a diameter to accommodate a coaxial cable connected to the connector. Part-tubular sections extend outwardly from the bottom of the body sections and form a tubular member to cover another part of the connector. Flexible latch members on one of the body sections latchably engage latching sections on the other of the body sections to latch the body sections together covering the connector.

5 Claims, 5 Drawing Figures

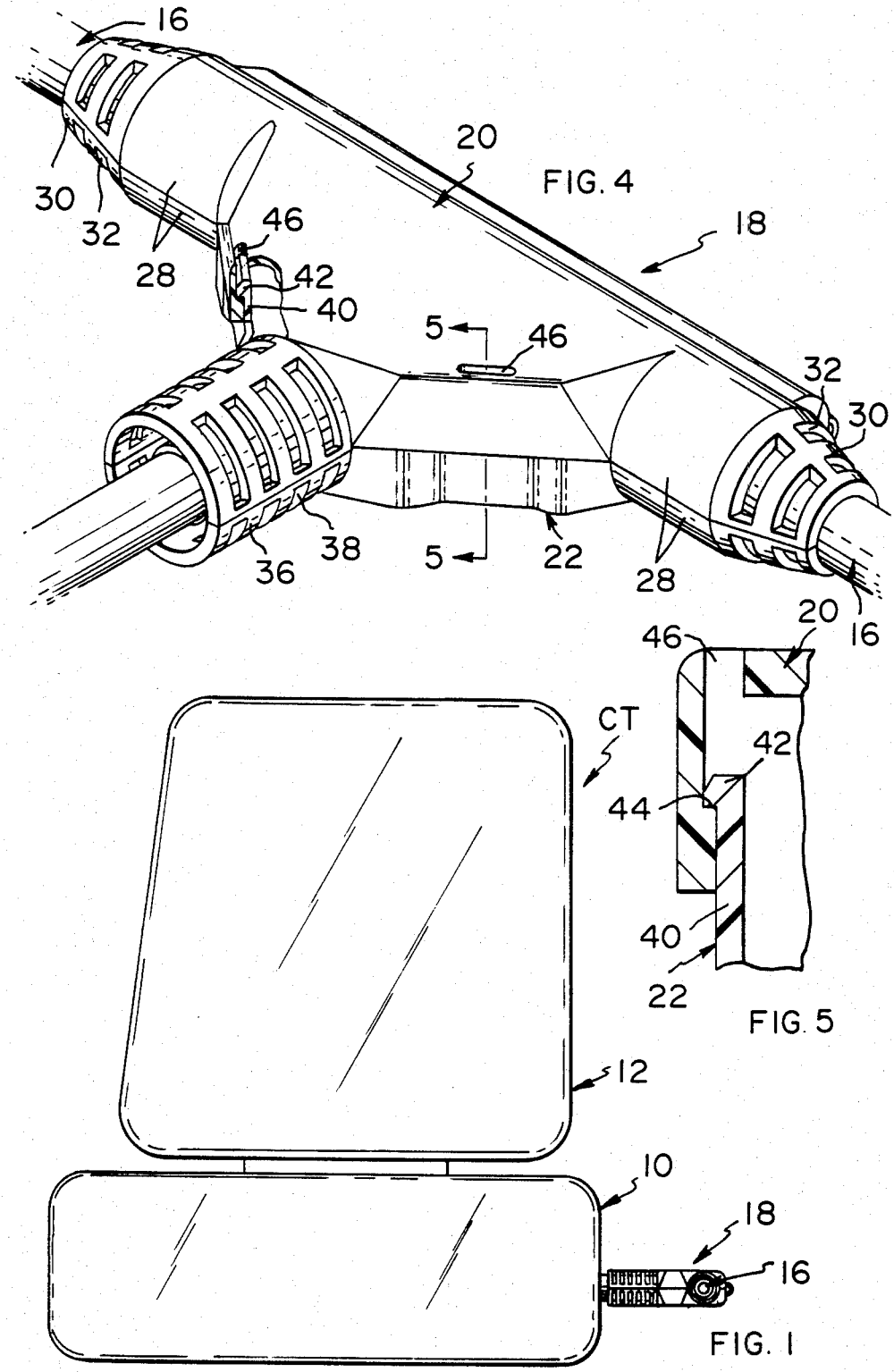

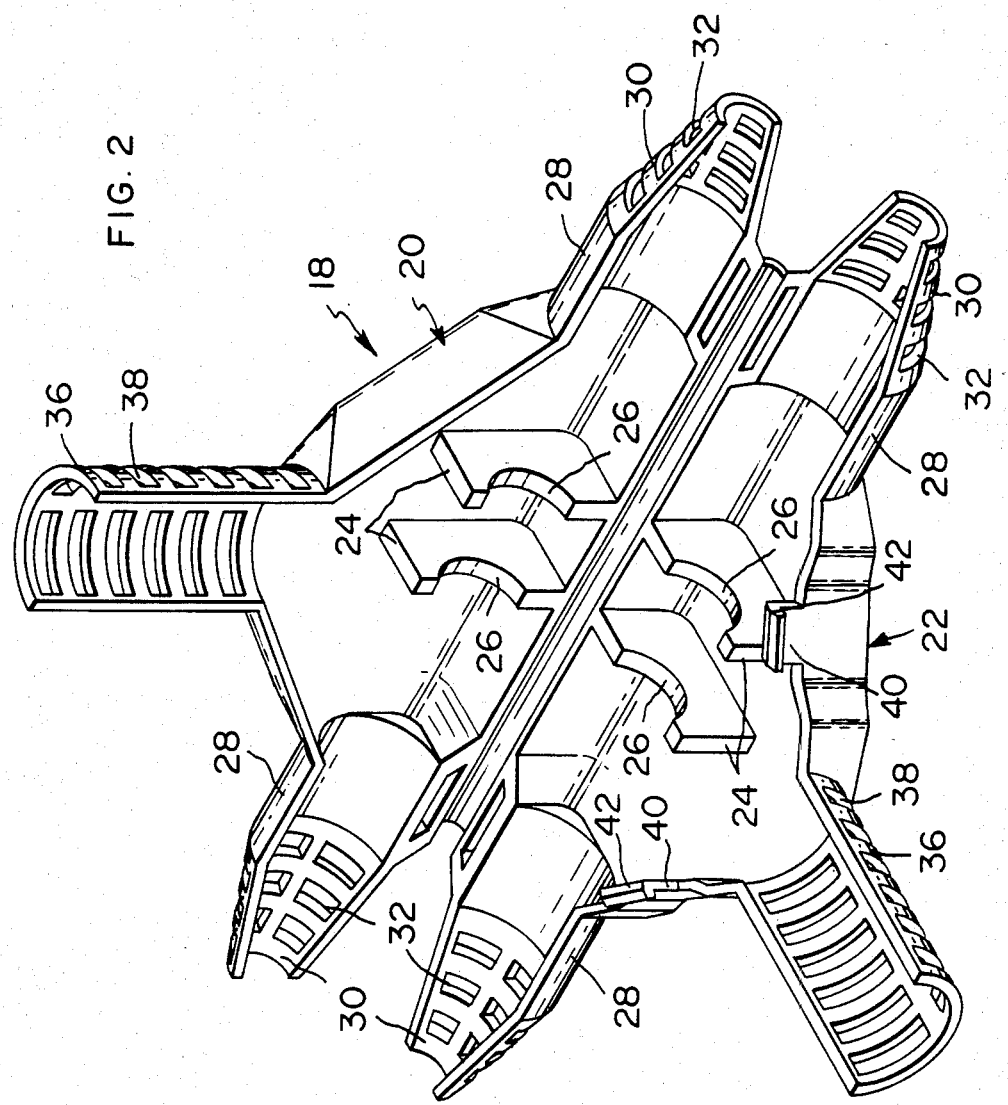

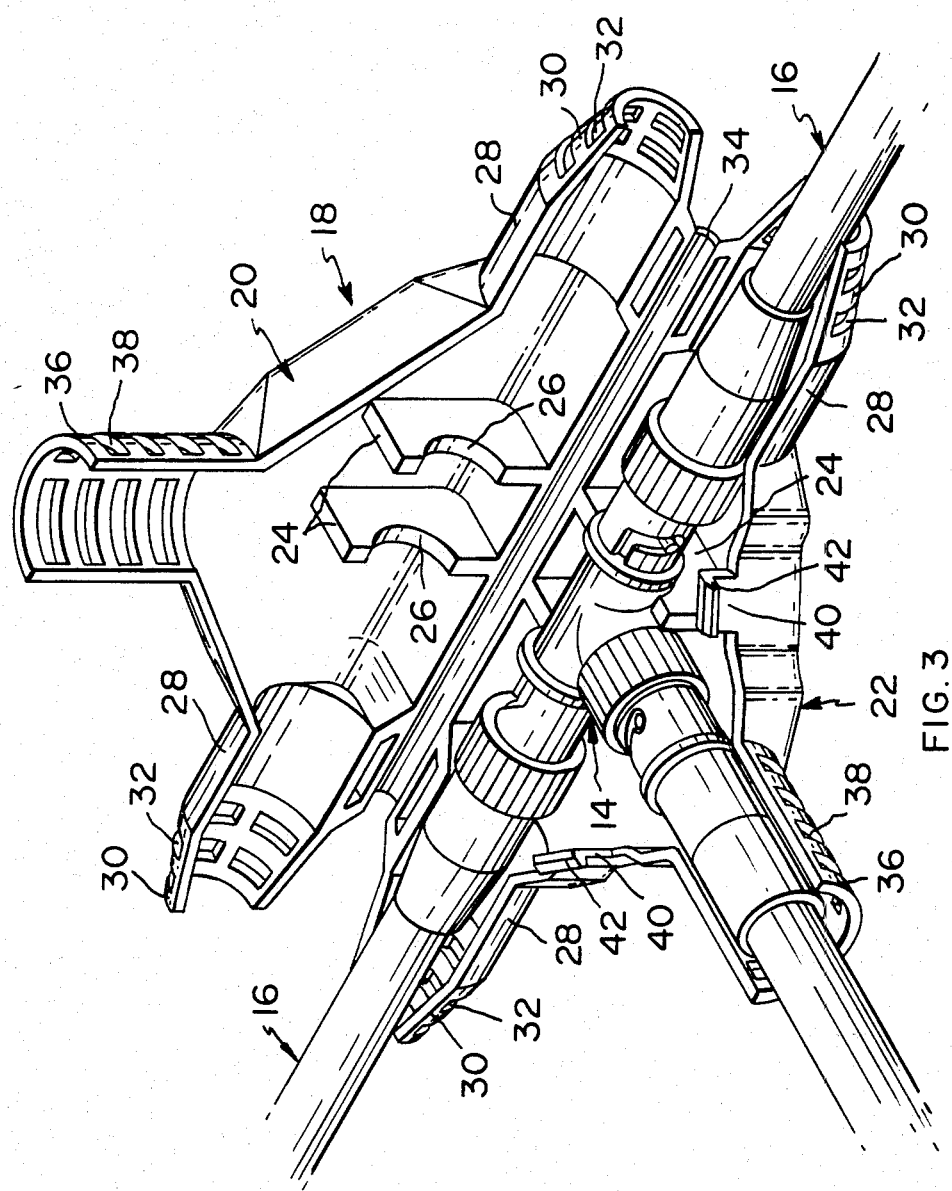

ELECTRICAL CONNECTOR HOUSING

FIELD OF THE INVENTION

This invention relates to housings and more particularly to housings for covering electrical connectors.

BACKGROUND OF THE INVENTION

Computer terminals are connected together via a coaxial cable to enable the terminals to receive information from a mainframe computer or other terminals and to transmit information to the mainframe computer or to other terminals. The computer terminals and the coaxial cable are connected at the terminals by a T-shaped coaxial connector. These coaxial connectors are subject to interference problems, especially when the terminals are exposed and disposed adjacent equipment, power lines or metal walls which can affect the signals being transmitted along the coaxial cable. In the event a high voltage is accidentally applied onto the cable, injury can occur to persons if they engage the exposed connectors. Accordingly, covering the connectors with dielectric housings will obviate these problems.

SUMMARY OF THE INVENTION

According to the present invention, an electrical connector housing comprises substantially identically-shaped housing members of dielectric material hingedly connected together along straight sides. Each housing member includes a hollow body section having a generally triangular configuration. Spaced projections are located in the body sections and include arcuate recesses to accommodate a T-shaped coaxial connector and maintain the connector in position when the body sections are in a closed position to encompass the connector. Semicircular sections extend outwardly from respective sides of the body sections and form tubular members to cover parts of the connector, the semicircular sections including part-conical sections that can be trimmed to form an opening having a diameter to accommodate a coaxial cable connected to the connector. Part-tubular sections extend outwardly from the bottom of the body sections and form a tubular member to cover another part of the connector. Flexible latch members on one of the body sections latchably engage latching sections on the other of the body sections to latch the body sections together covering the connector.

BRIEF DESCRIPTION OF THE DRAWINGS

FIG. 1 is a side elevational view of a computer terminal showing a housing covering a T-shaped coaxial connector connecting a coaxial cable to the terminal.

FIG. 2 is a perspective view of the connector housing in an open position.

FIG. 3 is a view similar to FIG. 2 showing a T-shaped coaxial connector positioned in the housing.

FIG. 4 shows the housing in a closed position.

FIG. 5 is a cross-sectional view taken along line 5—5 of FIG. 4.

DETAILED DESCRIPTION OF THE INVENTION

FIG. 1 shows a computer terminal CT of conventional construction which includes an electronics module 10 and a display module 12. A coaxial connector 14 of T-shaped construction as shown in FIG. 3 is connected to electronics module 10 in order to connect coaxial cable 16 thereto. In this way a number of computer terminals CT can be connected together via the coaxial cable to enable the terminals to receive information from the mainframe computer or other terminals and to transmit information to the mainframe or to other terminals.

An electrical connector housing 18 is latchably secured onto coaxial cable 16 to protect the connector from interference problems and to protect persons from a high voltage which may accidentally be applied to the cable. Housing 18 is molded from a suitable dielectric material and is in the form a clamshell including substantially identical sections 20 and 22. Each of sections 20 and 22 are hollow and have spaced projections 24 located therein which are disposed on each side of a central plane and they have arcuate recesses 26 therein in which coaxial connector 14 is disposed in order to maintain the connector in position therein when housing 18 is in a closed position as illustrated in FIG. 4. The parts of sections 20 and 22 containing projections 24 are of generally triangular configuration.

Semicircular members 28 extend outwardly from each side of sections 20 and 22 in alignment with spaced projections 24 and they include part-conical sections 30 that have openings 32 extending therethrough. Semicircular members 28 form tubular members when sections 20 and 22 are in a closed position covering parts of connector 14 while part-conical sections 30 form conical sections along cable 16 as shown in FIG. 4. Part-conical sections 30 can be trimmed to accommodate the diameter of cable 16. An integral hinge 34 connects sections 20 and 22 together so as to enable sections 20 and 22 to move relative to each other from an open to a closed position.

Part-tubular sections 36 extend outwardly from the bottom of sections 20 and 22 and they have openings 38 extending therethrough. Part-tubular sections 36 form a tubular member covering part of connector 14 extending outwardly from computer terminal CT and they can be trimmed to proper size to cover this part of the connector and still be clear of the computer terminal as shown in FIG. 1.

Section 22 has flexible latching members 40 on each side of part-tubular section 36 and they have hook members 42 at their free ends which latchably engage with latching surfaces 44 located on the inner surface of section 20 in alignment with openings 46 therein.

Housing 18 can readily be placed on coaxial connector 14 extending outwardly from computer terminals CT and maintained in position therein by spaced projections 24 and flexible latching members 40 latch housing 18 in position thereby completely covering connector 14 to isolate it from interference problems and to protect personnel from extraneous high voltage that may accidentally occur on cable 16.

I claim:

1. An electrical connector housing for enclosing a T-shaped electrical connector connected to electrical cables, comprising:

substantially identically-shaped housing members hingedly connected along straight sides;

each of said housing members having a hollow body section in which spaced projections are located, said spaced projections including arcuate recesses to accommodate the T-shaped electrical connector to maintain the connector in position when the housing members are in a closed position;

semicircular sections extend outwardly from respective sides of the body sections and form tubular members to cover parts of the connector when the housing members are in the closed position, said semicircular sections including part-conical sections that cover the cables adjacent the connector when the housing members are in the closed position;

part-tubular sections extend outwardly from the bottom of the body sections and form a tubular member when the housing members are in the closed position to cover another part of the connector; and flexible latch members on one of the housing members for latchably engaging latching surfaces on the other of the housing members to latch the housing members together covering the connector.

2. An electrical connector housing as set forth in claim 1, wherein said body sections have a generally triangular configuration.

3. An electrical connector housing as set forth in claim 1, wherein said part-conical sections and said part-tubular sections have openings to enable them to be trimmed to size.

4. An electrical connector housing as set forth in claim 1, wherein said spaced projections are located on each side of a central plane including the longitudinal axis of the part-tubular sections.

5. An electrical connector as set forth in claim 4, wherein said spaced projections are in alignment with said semicircular and part-conical sections.

* * * * *